(12) United States Patent  (10) Patent No.: US 9,104,311 B2
Dubs et al.  (45) Date of Patent: Aug. 11, 2015

(54) SLATE COMPUTER WITH TACTILE HOME KEYS

(75) Inventors: Justin Tyler Dubs, Durham, NC (US); Howard Jeffrey Locker, Cary, NC (US); QianYing Wang, Beijing (CN); Jennifer Greenwood Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2006 days.

(21) Appl. No.: 12/248,208

(22) Filed: Oct. 9, 2008

(65) Prior Publication Data

US 2010/0090963 A1  Apr. 15, 2010

(51) Int. Cl.
*G09F 5/00* (2006.01)
*G06F 3/041* (2006.01)
*G06F 3/0488* (2013.01)

(52) U.S. Cl.
CPC .. *G06F 3/04886* (2013.01); *G06F 2203/04809* (2013.01)

(58) Field of Classification Search
USPC ................................................ 345/156, 173
See application file for complete search history.

(56) References Cited

U.S. PATENT DOCUMENTS

| 5,841,374 | A | * | 11/1998 | Abraham | 341/34 |
|---|---|---|---|---|---|
| 7,002,557 | B2 | * | 2/2006 | Iizuka et al. | 345/173 |
| 7,310,053 | B2 | * | 12/2007 | Bollman | 341/22 |
| D584,302 | S | * | 1/2009 | Sogabe | D14/341 |
| 7,480,524 | B2 | * | 1/2009 | Moon et al. | 455/575.4 |
| 7,653,883 | B2 | * | 1/2010 | Hotelling et al. | 715/863 |
| 7,768,501 | B1 | * | 8/2010 | Maddalozzo et al. | 345/173 |
| 7,884,807 | B2 | * | 2/2011 | Hovden et al. | 345/173 |
| 8,179,375 | B2 | * | 5/2012 | Ciesla et al. | 345/173 |
| 2004/0013457 | A1 | * | 1/2004 | Morris | 400/489 |
| 2005/0030292 | A1 | * | 2/2005 | Diederiks | 345/173 |
| 2006/0026536 | A1 | * | 2/2006 | Hotelling et al. | 715/863 |
| 2006/0238517 | A1 | * | 10/2006 | King et al. | 345/173 |

* cited by examiner

*Primary Examiner* — Temesgh Ghebretinsae
*Assistant Examiner* — Benyam Ketema
(74) *Attorney, Agent, or Firm* — John L. Rogitz; John M. Rogitz

(57) ABSTRACT

Fingertip-sized discrete areas are provided on a slate computer and have different tactile characteristics than the remainder of the surface on which they are disposed. The discrete areas are arranged to mimic home keys of a keyboard and each discrete area corresponds to a respective home key. In this way, a user is given tactile feedback of when fingers are properly placed in the home position, with home key finger placement triggering the presentation of a full keyboard on screen. Other embodiments do not use tactilely distinct keys, with simultaneous placement of two or more fingers on the computer triggering display of the virtual keyboard.

21 Claims, 2 Drawing Sheets

SLATE COMPUTER WITH TACTILE HOME KEYS

I. FIELD OF THE INVENTION

The present invention relates generally to slate computers.

II. BACKGROUND OF THE INVENTION

Slate computers, as the name implies, essentially are slate-like objects almost the entire top surface of which is defined by a touch-sensitive computer screen. To save space, slate computers do not have physical keyboards. Input is effected through the touch-sensitive screen, which may display an image of a keyboard. Such an image can be regarded as a virtual keyboard.

SUMMARY OF THE INVENTION

As understood herein, touch typists are trained to place their fingers on home keys of a keyboard, as reference positions for their fingers. As also understood herein, a disadvantage of a virtual keyboard is that it fails to provide tactile feedback when fingers are placed on home keys, which many touch typists otherwise have come to expect from keyboard use, having learned typing on a physical keyboards.

A slate computer includes a housing, a processor in the housing, and a touch sensitive screen on the housing and communicating with the processor. The screen defines at least part of a surface of the computer. Plural discrete areas are arranged on the surface. The discrete areas have different tactile characteristics than the surface on which they are arranged. The discrete areas can be arranged on the surface to mimic home keys of a keyboard. The slate computer has no physical keyboard, however.

The discrete areas can be portions of the screen or portions of the surface that surround the screen. Each discrete area can correspond to a respective home key of, e.g., a QWERTY keyboard. Thus, eight discrete areas may be provided.

The discrete areas can be established by respective concavities in the surface. Or, the discrete areas can be established by respective convexities in the surface. Yet again, the discrete areas can be established by respective areas having a first material texture, with the surface having a second material texture. In any case, the processor can present an image of a keyboard on the screen in response to sensing pressure on all of the discrete areas.

In another aspect, a computer includes a processor, a housing bearing the processor, and a touch sensitive screen on the housing communicating with the processor. Plural discrete areas are on the screen, with each discrete area being tactilely discriminable from areas of the screen outside the discrete areas.

In another aspect, a method includes providing a touch sensitive computer screen on a computer, and defining how many of plural discrete areas on the computer must be touched simultaneously to indicate a desire to display an image of a keyboard. The computer does not have a physical keyboard, however. The method also includes presenting an image of a keyboard on the screen in response to sensing pressure on all of the plural areas.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
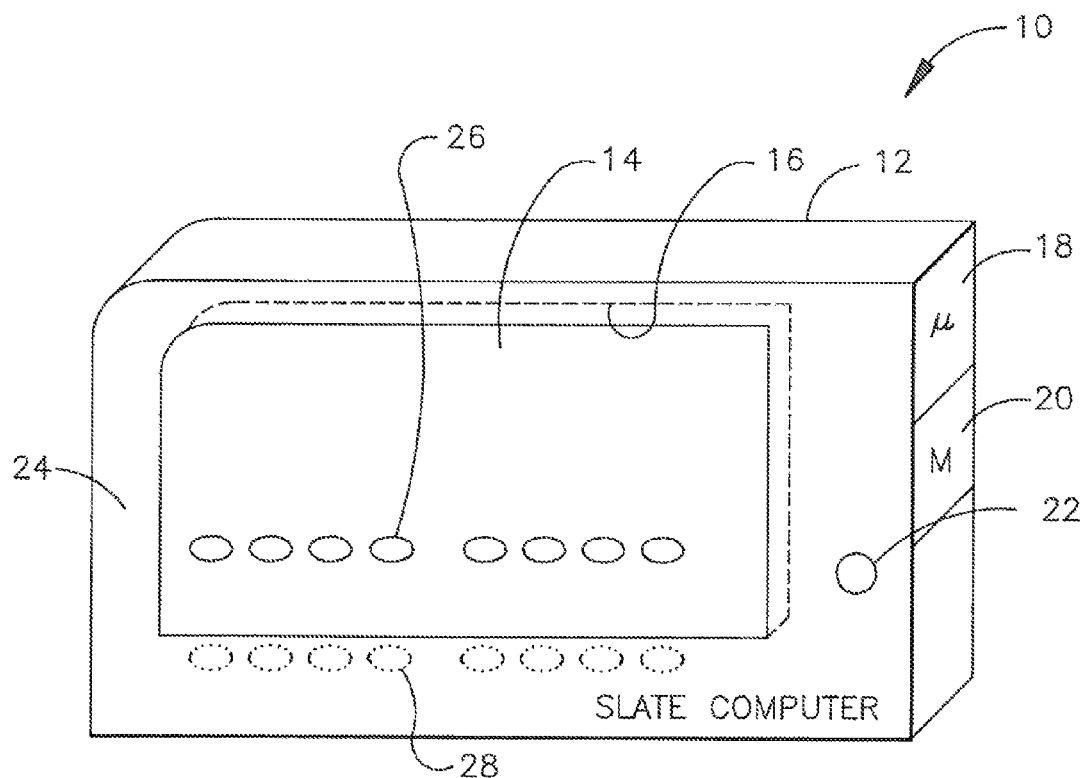
FIG. 1 is a partially schematic view of a slate computer, showing the pressure sensor array underlying the screen in phantom and schematically showing the processor and computer readable storage medium, and also showing an alternate placement of the home key areas in phantom.

FIG. 1 shows a slate computer 10 having a lightweight portable hollow housing 12 bearing a computer screen 14. Pressure on the screen 14 as can be developed when a person touches the screen can be sensed by pressure sensors 16 such as a pressure sensor array in accordance with touch screen principles, such that the screen 14 with sensors 16 establish a touch sensitive screen that communicates with a processor 18 in the housing 12. The processor 18 may access one or more tangible computer readable storage media 20 such as disk-based storage, solid state storage, etc. preferably the example slate computer 10 has no physical keyboard, with keyed entry being provided by the screen 14 as set forth further below, although the slate computer can include a pointing and clicking input device 22 such as a mouse, trackball, joystick, touchpad, etc. if desired.

The screen 14 may establish the entire top surface of the computer 10 or, as shown, it may establish part of the top surface, with the remainder of the top surface being established by a portion 24 of the housing that frames the screen.

Plural discrete areas 26 are on the surface with which the screen 14 is associated, either on the screen 14 itself as shown in solid or on the portion 24 of the housing that frames the screen as shown in phantom at 28. The discrete areas may be ovular in shape or rectilinear in shape and generally are sized to be as large as an adult person's fingertips. The discrete areas 26 preferably are transparent, i.e., except for their convexity or concavity or other tactile distinction vis-a-vis the surface they are on, they appear as part of the surface with the same visual impression of the surface.

In any case, the discrete areas have different tactile characteristics than the remainder of the top surface on which they are disposed. For example, the discrete areas can be established by respective concavities in the screen 14, or by respective convexities in the screen 14, or by respective areas having a different material texture than the remainder of the screen 14.

It may readily be appreciated in reference to FIG. 1 that the discrete areas may be arranged on the top surface to mimic home keys of a keyboard such as a QWERTY keyboard. Thus, there may be eight discrete areas as shown, with each discrete area corresponding to a respective home key. While the discrete areas 26/28 are shown arranged in a line, they may be arranged in other patterns, e.g., an arc.

Figure 2:
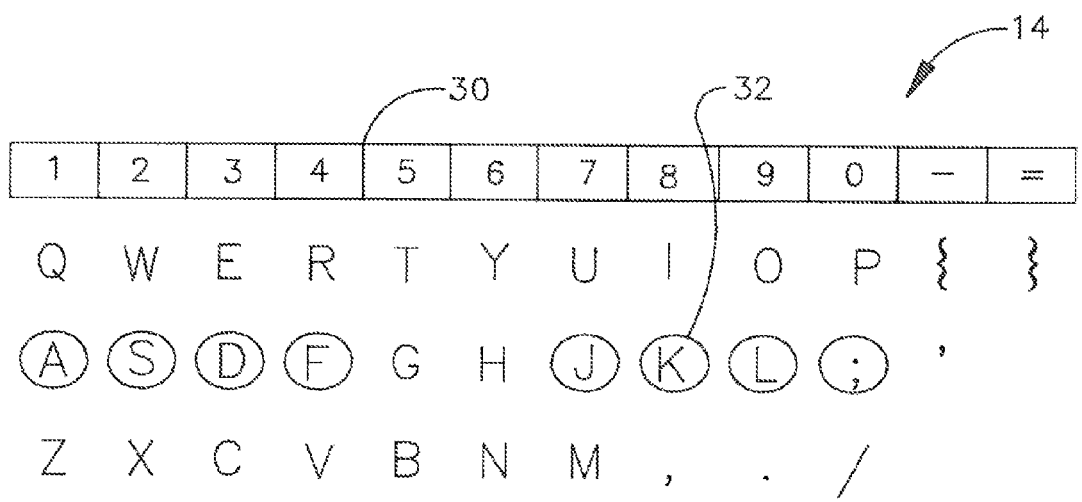
FIG. 2 is a screen shot showing the virtual keyboard.

Turning to FIG. 2, the processor 18 can present an image 30 of a virtual keyboard on the screen 14. In example embodiments the processor 18 presents the image 30 in response to sensing pressure on all of the discrete areas 26, indicating that a user is ready to commence keyboard-like data entry. As shown in FIG. 2, keys 32 on the image 30 that correspond to the home keys represented by the discrete areas 26 may be visually highlighted if desired. It is to be understood that the processor interprets pressure on each key of the virtual keyboard to indicate input of the corresponding letter shown on the virtual keyboard.

Figure 3:
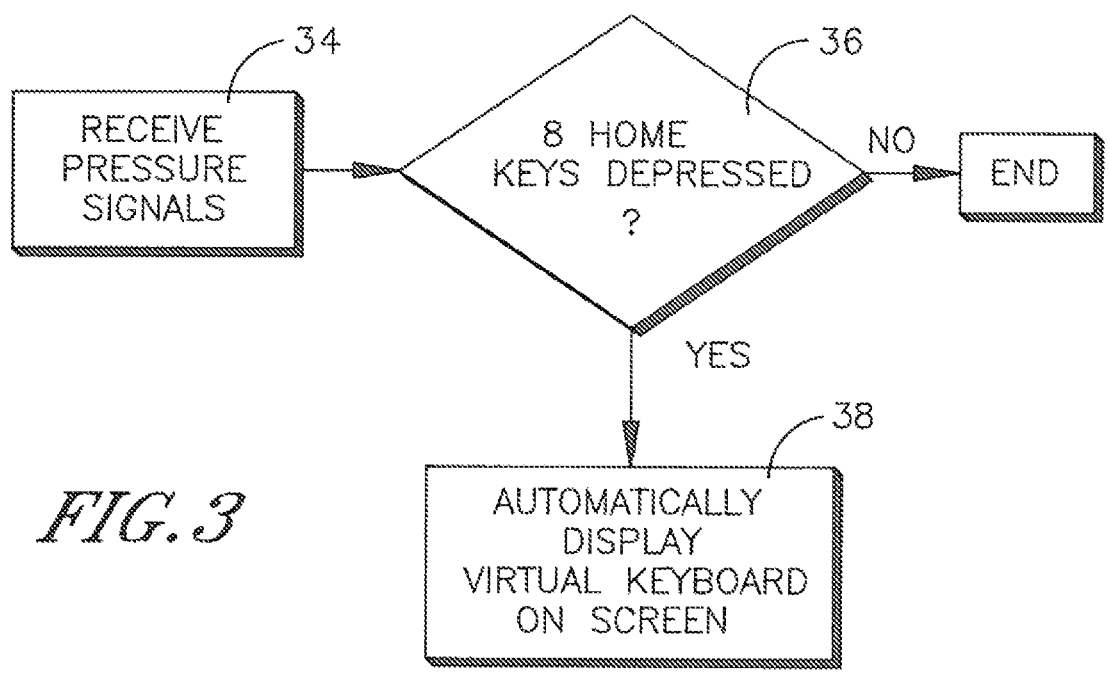
FIG. 3 is a flow chart of non-limiting logic for invoking the virtual keyboard shown in FIG. 2.

FIG. 3 shows an example of the above logic. Pressure signals from the touch screen (or, when the discrete areas 28 are implemented on the portion 24 of the housing 12 framing the screen, from the areas 28) are received by the processor 18 at block 34. At decision diamond 36 the processor 18 determines whether all of the discrete areas 26 (or when implemented on the housing, the discrete areas 28) have been touched and if so, the virtual keyboard 30 shown in FIG. 2 is automatically presented by the processor 18 on the screen 14.

It is to be understood that in some embodiments the logic of FIG. 3 does not require that the home key areas be of different tactile characteristics than the rest of the surface surrounding them. Instead, if the eight fingers that typically rest on home keys of a physical keyboard are detected as touching a touchscreen (with no tactilely different areas) at spacings corresponding to home key locations, then the logic of FIG. 3 may be implemented to automatically display the virtual keyboard on screen. Less than eight home key positions may be used to trigger the display of the keyboard, e.g., the touch of two fingers corresponding to the QWERTY keys "F" and "J" may be used, and moreover in embodiments using tactilely distinct areas, less than all eight home keys, e.g., the QWERTY home key positions for the keys "F" and "J", can be provided.

More broadly, a user can place any plural fingers (e.g., two or more) on the touch screen simultaneously, which will be interpreted by the processor as a desire to display an image of a keyboard. Eight fingers may preferably be used as a trigger indicating home key placement of fingers but less than eight may also be used. Similar to the touchpad ignoring a palm placed on it, the below algorithm may be used.

A factory set default for eight points and the size/spacing of each point needed to trigger the display of the keyboard on screen may be set. Then in the application/driver an option can be provided for a user to override the defaults and train the system on what pattern should make the keyboard pop up. The number of fingers, size, spacing, etc. may be specified by the user. To do this, the user can enter a configuration mode and place his or her fingers on the screen, and the processor then correlates that placement with a subsequent desire to cause the keyboard image to appear.

While the particular SLATE COMPUTER WITH TACTILE HOME KEYS is herein shown and described in detail, it is to be understood that the subject matter which is encompassed by the present invention is limited only by the claims.

What is claimed is:

1. Slate computer comprising:
a housing;
a processor in the housing;
a touch sensitive screen on the housing and communicating with the processor, the screen defining at least part of a surface of the computer; and
plural discrete areas on the surface, the discrete areas having different tactile characteristics than the surface, the discrete areas being arranged on the surface to mimic home keys of a keyboard, the slate computer having no physical keyboard.

2. Computer of claim 1, wherein the discrete areas are portions of the screen.

3. Computer of claim 1, wherein each discrete area corresponds to a respective home key.

4. Computer of claim 1, comprising more than two and less than eight discrete areas.

5. Computer of claim 1, comprising eight discrete areas.

6. Computer of claim 1, wherein the discrete areas are established by respective concavities in the surface.

7. Computer of claim 1, wherein the discrete areas are established by respective convexities in the surface.

8. Computer of claim 1, wherein the discrete areas are established by respective areas having a first material texture, the surface having a second material texture.

9. Computer of claim 1, wherein the processor presents an image of a keyboard on the screen in response to sensing pressure on all of the discrete areas.

10. Computer comprising:
processor;
housing bearing the processor;
touch sensitive screen on the housing communicating with the processor; and
plural discrete areas on the screen, each discrete area being tactilely discriminable from areas of the screen outside the discrete areas.

11. Computer of claim 10, wherein the discrete areas are arranged on the surface to mimic home keys of a keyboard.

12. Computer of claim 10, wherein each discrete area corresponds to a respective home key.

13. Computer of claim 10, comprising eight discrete areas.

14. Computer of claim 10, wherein the discrete areas are established by respective concavities in the screen.

15. Computer of claim 10, wherein the discrete areas are established by respective convexities in the screen.

16. Computer of claim 10, wherein the discrete areas are established by respective areas having a first material texture, the screen having a second material texture.

17. Computer of claim 10, wherein the processor presents an image of a keyboard on the screen in response to sensing pressure on all of the discrete areas.

18. Method comprising:
providing a touch sensitive computer screen on a computer;
defining how many of plural discrete areas corresponding to home keys of a keyboard on the computer must be touched simultaneously to indicate a desire to display an image of a keyboard, the computer not having a physical keyboard; and
presenting an image of a keyboard on the screen in response to sensing pressure on all of the plural areas.

19. Method of claim 18, wherein the plural areas do not have a tactile feel different from a surface in which they are defined.

20. Method of claim 18, wherein the plural areas are established by respective concavities in the computer.

21. Method of claim 18, wherein the plural areas are established by respective convexities in the computer.

* * * * *